March 3, 1970  M. SCHWARZMANN  3,498,982
PROTECTING THE INNER WALLS OF A REACTOR FOR
THE SYNTHESIS OF MELAMINE
Filed April 26, 1968

INVENTOR:
MATTHIAS SCHWARZMANN
BY
Marzall, Johnston, Cook & Root
ATT'YS

United States Patent Office 3,498,982
Patented Mar. 3, 1970

3,498,982
PROTECTING THE INNER WALLS OF A REACTOR FOR THE SYNTHESIS OF MELAMINE
Matthias Schwarzmann, Limburgerhof, Pfalz, Germany, assignor to Badische Anilin- & Soda-Fabrik Aktiengesellschaft, Ludwigshafen (Rhine), Germany
Filed Apr. 26, 1968, Ser. No. 724,477
Int. Cl. C07d 55/28, 55/30
U.S. Cl. 260—249.7                                3 Claims

ABSTRACT OF THE DISCLOSURE

Melamine is prepared from urea in the presence of catalysts at temperatures of 220° to 500° C. at atmospheric pressure. The walls of the reactor in which the reaction is carried out are kept at a temperature which is lower than that which prevails in the reaction zone. In this way a coherent coating is produced along the inner walls which protects the walls from the corrosive gas present in the reaction zone.

---

Figure 1:
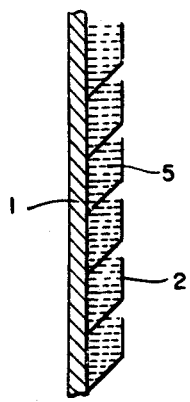

The present invention relates to a process for the production of melamine by thermal treatment of urea.

It is known that melamine can be prepared from urea and/or thermal decomposition products thereof in the presence of catalysts which are thermally resistant, porous and large-surfaced and in the presence of ammonia or a gas containing the same at temperatures of 220° to 500° C. and at atmospheric or superatmospheric pressure. The fact that the gases and gaseous compounds, such as ammonia, carbon dioxide and isocyanic acid, which are present in the reactor, have an extremely corrosive action constitutes a considerable difficulty in the said synthesis. For this reason it is not possible to use structural steel, boiler plate or high grade steel such as are conventionally used in the construction of this type of equipment because they would be corroded within a short time. It is rather necessary to use for the construction of such reactors very expensive materials, such as titanium, tantalum and nickel alloys with varying amounts of molybdenum, chromium, manganese, copper, silicon and iron which are to some extent resistant to the corrosive atmosphere prevailing in the reactor. The use of such materials however greatly affects the economy of the process and there have been many, as yet unsuccessful, attempts to find cheaper corrosion-resistant materials.

The present invention has for its object to carry out the reaction of urea at temperatures of from 220° to 500° C. at atmospheric or substantially atmospheric pressure in the presence of catalysts and ammonia or gases containing ammonia to form melamine in such a way that even reactors prepared from easily corroded material are resistant to the corrosive atmosphere present in the reaction zone.

We have found that this object is achieved by keeping the temperature of the inner wall of the reactor at a temperature below that prevailing in the reaction zone.

The lowering of the temperature of the inner wall of the reactor in accordance with this invention as compared with the temperature prevailing in the reactor results in the temperature of the inner wall being below the dewpoint of some of the substances (such as ammeline, ammelide and particularly melem) contained in the atmosphere in the reactor. In this way a coherent coating of these substances, particularly of melem, can form on the inner wall of the reactor because the reactor atmosphere is in general saturated with these substances, and this coating effectively protects the wall from the corrosive influences of the reactor atmosphere. Since as stated the reactor atmosphere is in general saturated with melem, it is sufficient for the temperature of the reactor wall to be only a few degrees centigrade below the temperature prevailing in the reaction zone to achieve the said effect. It is sufficient to lower the temperature of the wall by up to 50° C. with respect to the reactor atmosphere and in general a difference of 1° to 20° C., advantageously of 2° to 10° C., is maintained. Obviously, the temperature of the inner wall may be lowered more; in general however this will not be done to avoid unnecessary loss of heat.

Lowering the temperature of the inner wall of the reactor may be carried out in various ways. In principle it can be done by suitably designing the external insulation conventionally provided against heat loss. To avoid loss of heat however the external insulation can be wholly or partly transferred to the interior of the reactor. In principle the type of insulation used is immaterial. It may be a gas-filled space which communicates with the reactor atmosphere or a space which is filled up with loose insulating material. Porous brickwork is also suitable. The gas or gaseous compound present in the reactor diffuses through the pores or openings to the gas-filled space to the actual reactor wall and forms a coherent coating in consequence of the lower temperature prevailing there.

According to a preferred embodiment of the invention, the lowering of the temperature of the inner wall of the reactor is effected by stationary layers of catalyst arranged along the inner wall. These layers can be brought about in a simple manner by arranging along the inner wall at different levels bracket-like flights running round the entire periphery of the reactor on which the catalyst lies. If the flights are made of material which is not resistant to corrosion they may be readily replaced at one- to three-year intervals. Obviously, they may also be made of corrosion-resistant material. The advantage over reactors made of corrosion-resistant material is that the walls of the reactor, which have structural functions, require much more corrosion-resistant material than the bracket means described above.

Figure 2:
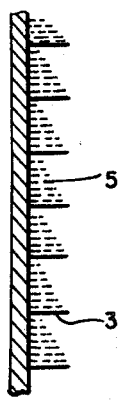
Figure 3:
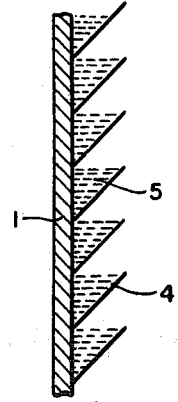

The invention will now be described with reference to the drawing in which FIGURES 1 to 3 illustrate diagrammatically by way of example embodiments of the design of the inner wall of a reactor. The same reference numerals are used for the same items in all the figures.

Referring to FIGURE 1, the reactor wall 1 is provided at different levels around its entire periphery with flights 2 filled with catalyst 5. The distance between the flights 2 is chosen so that the whole of the inner wall is covered by catalyst and, owing to the insulating effect thereof, a temperature is set up at the inner wall which is lower than the temperature prevailing in the reaction zone. Flights 3 and 4 in FIGURES 2 and 3 are different in shape from flights 2 in FIGURE 1.

It is also possible to provide the inner wall with supporting members arranged one above another on which lie rings arranged concentrically to the wall. These rings can easily be exchanged. Since the reactors for synthesizing melamine are as a rule fluidized-bed reactors, stationary layers consisting of catalyst build up on these rings. According to the angle of repose of the catalyst, the distance between the rings should be chosen so that the whole of the inner wall of the reactor is covered by a layer of catalyst. In the case of stationary bed reactors, the layers can be formed on the rings prior to starting up the reactor.

It is possible by the present invention to substantially protect the reactor wall from the corrosive influences of the substances present in the gas space in the melamine synthesis, such as amomnia, carbon dioxide or isocyanic acid, so that material can be used which otherwise would be heavily corroded within a short time by the atmosphere present in the reactor. The known disadvantages of using these materials, such as iron, ordinary high grade steel and other low alloy steels, for example poor yields and unsatisfactory quality of the melamine obtained, do not arise.

Obviously the high grade materials such as titanium, tantalum and nickel alloys, described above may be used and their life can be further prolonged by the process according to this invention.

The invention is further illustrated by the following two comparative examples.

EXAMPLE 1

(A) A fluidized-bed reactor having a diameter of 1600 mm. and a height of 8000 mm. and made of steel having the composition 17.5% by weight of chromium, 7.5% by weight of nickel and a maximum of 0.15% by weight of carbon, the remainder being iron, is charged per hour with 500 kg. of urea and 1400 m.$^3$ (STP) of a fluidizing gas consisting of 67% by volume of ammonia and 33% by volume of carbon dioxide, the temperature in the interior of the reactor being kept at 300° C. 4000 kg. of aluminum oxide having a particle size of from 0.1 to 0.5 mm. is present in the reactor as catalyst.

The wall thickness of the reactor has decreased by 0.6 mm. after operation for 3000 hours.

(B) A reactor as described under (A) is provided around its entire periphery with flights as shown in FIGURE 1 of the drawing arranged one above another at intervals of 20 cm. After the same operational period under the same conditions, there is a film-like layer of melem on the inner wall. The flights are arranged so that a layer of catalyst of almost uniform thickness is formed over the whole of the inner wall of the reactor.

EXAMPLE 2

(A) A melamine synthesis reactor made from boiler plate H 1 according to German Standard DIN 17,155 (which contains, in addition to iron, not more than 0.16% of carbon, not more than 0.35% of silicon, about 0.40 to 2.00% of manganese, not more than 0.050% of phosphorus and not more than 0.050% of sulfur) and having the same dimensions as that described under (A) in Example 1 is operated under the conditions therein described. After an operating period of 3000 hours the wall thickness has decreased by 0.8 mm.

(B) The reactor described in Example 2 (A) is provided with flights in the same way as described in Example 1 (B). After the same operational period (3000 hours) there is no decrease in the thickness of the wall.

I claim:
1. A process for the production of melamine from urea or a thermal decomposition product thereof in the presence of ammonia and a catalyst at a temperature of from 220° to 500° C. at substantially atmospheric pressure in a reaction zone wherein the temperature of the inner face of the boundary defining the reaction zone is kept at a temperature which is lower than that which prevails in the reaction zone.

2. A process as claimed in claim 1 wherein the temperature at the surface defining the reaction zone is kept at a temperature which is up to 50° C. lower than the temperature within the reaction zone.

3. A process as claimed in claim 1 wherein the temperature at the surface defining the reaction zone is kept at a temperature which is from 2° to 10° C. below the temperature prevailing in the reaction zone.

References Cited

UNITED STATES PATENTS 3,377,350    4/1968    Watson et al. _____ 260—249.7
3,432,501    3/1969    Weinrotter et al. ___ 260—249.7

HENRY R. JILES, Primary Examiner

J. M. FORD, Assistant Examiner